(12) United States Patent
Roche (10) Patent No.: US 7,866,076 B2
(45) Date of Patent: Jan. 11, 2011

(54) DISPLAY MATERIALS, ACCESSORIES THEREFOR AND METHODS

(76) Inventor: Bonnie Roche, 838 Fifth Ave., New York, NY (US) 10065

( * ) Notice: Subject to any disclaimer, the term of this patent is extended or adjusted under 35 U.S.C. 154(b) by 0 days.

(21) Appl. No.: 12/369,303

(22) Filed: Feb. 11, 2009

(65) Prior Publication Data

US 2009/0139065 A1 Jun. 4, 2009

Related U.S. Application Data (63) Continuation of application No. 10/876,926, filed on Jun. 25, 2004, which is a continuation of application No. 09/595,122, filed on Jun. 16, 2000, now abandoned.

(60) Provisional application No. 60/139,465, filed on Jun. 16, 1999, provisional application No. 60/154,030, filed on Sep. 16, 1999.

(51) Int. Cl.
*G09F 7/00* (2006.01)

(52) U.S. Cl. ............... 40/661.01; 24/711.4; 24/303; 40/600; 40/711

(58) Field of Classification Search ............... None
See application file for complete search history.

(56) References Cited

U.S. PATENT DOCUMENTS

| 1,120,656 | A | * | 12/1914 | Hunt | 411/477 |
| 2,487,489 | A | * | 11/1949 | Spader | 312/73 |
| 2,568,835 | A | * | 9/1951 | Thompson | 254/21 |
| 3,456,373 | A | * | 7/1969 | Epton | 40/124 |

* cited by examiner

*Primary Examiner*—Jack W. Lavinder
(74) *Attorney, Agent, or Firm*—Ostrolenk Faber LLP (57) ABSTRACT

A pushpin comprising a pin suitable for penetrating a pin permeable object for frictional engagement with the pin permeable object; a gripping handle on the pin, the gripping handle having a magnet attractive surface so that a magnet can be attached to the gripping handle thereby to allow an object to be displayed to be secured to the gripping handle between the handle and the magnet.

1 Claim, 9 Drawing Sheets

SINGLE UNIT

MULTIPLE UNITS WITH MAGNETIC
OR OTHER ATTACHMENTS VISIBLE

Fig. 15B

MULTIPLE UNITS WITH MAGNETIC OR OTHER
ATTACHMENTS NON-VISIBLE

DISPLAY MATERIALS, ACCESSORIES THEREFOR AND METHODS

CROSS REFERENCE TO RELATED APPLICATION

This application is a continuation application of U.S. patent application Ser. No. 10/876,926, filed Jun. 25, 2004 entitled "DISPLAY DEVICES, ACCESSORIES THEREFORE AND METHODS", which application is a continuation application of U.S. patent application Ser. No. 09/595,122, filed Jun. 15, 2000 entitled "DISPLAY DEVICES, ACCESSORIES THEREFORE AND METHODS", which application claims the benefit and priority of U.S. Provisional Patent Application Ser. Nos. 60/139,465 filed Jun. 16, 1999 and 60/154,030 filed Sep. 16, 1999.

BACKGROUND OF THE INVENTION

The present invention relates to display devices and in particular to display devices such as bulletin boards or materials which can be used to form structural and/or ornamental display surfaces. For example, the present invention can be used to form walls for modular offices that serve as display surfaces. Further, the present invention could be used to manufacture surface materials such as wall coverings and wallpaper for use on walls and thereby serve as a display surface.

In particular, the present invention allows objects to be displayed thereon by allowing securement of objects to be displayed either by pushpin securement or by magnetic securement. Reference is made to U.S. Pat. Nos. 5,295,342 and 5,384,999 which disclose a display device having an apertured magnet attractive surface and a permeable material below the magnet attractive surface which allows objects to be secured both by pushpin and/or magnetic securement.

SUMMARY OF THE INVENTION

The present invention relates to a display device which may comprise a composite material and accessories for use with the display device including magnets and pushpins. According to one aspect, the invention comprises a composite material which is embedded with iron, other ferromagnetic material, magnetic attractive material and/or magnetic material in order to secure articles by magnets, magnetic attractive material and/or material which is permeable to pins, thereby allowing dual securement by magnet, or magnet attractive material and pushpins.

According to one aspect, the magnet attractive material or magnetic material is adhered to the surface of a material permeable to pushpins. According to another aspect, the magnet attractive material or magnetic material is aligned with the surface of the material permeable to pushpins. According to yet another aspect, the magnet attractive material or magnetic material is embedded within or beneath the material permeable to pushpins.

According to another aspect, the invention comprises a magnet attractive material or magnetic material which presents itself as a continuous or discontinuous layer either as strands, separate individual pieces or as a laminated, or woven layer or as a layer adhered or attached to another material to become an integral part of the structure of a non-woven or woven sheet material in which the magnet attractive or magnetic material is visible or nonvisible and optionally permeable to pushpins for the display of objects, for example, memos, photos, notes, etc.

According to another aspect, the invention comprises an adhesive magnet. A magnet is provided with an adhesive substance on the surface of the magnet. In this way the magnet can be secured to non-magnetic objects by the adhesive to allow the non-magnetic object to be secured to a magnet attractive surface. In particular, the adhesive magnet can be provided on a substrate or sheet of releasable backing material. A plurality of the magnets can be disposed on the sheet of backing material like "candy buttons'. When the user wishes to use one of the adhesive magnets, one can be removed from the substrate, thereby exposing the adhesive on the magnet and the magnet can thereafter be adhered to a non magnet attractive object. The object can be secured to a magnet attractive surface via the magnet.

According to another aspect of the invention, the display device of the present invention can be made in modular form with the individual modular units being assemblable together into a larger display device either by fastening means such as clips, screws, etc., or by fastening means such as magnets and magnet attractive material.

According to another aspect, the invention comprises an integral pushpin and magnet for use with the display device of the present invention. According to another aspect the invention comprises a magnet with a pin housing surrounding the magnet. Other push pins and magnets are also disclosed herein.

According to another aspect, the invention comprises a display device made of a composite material comprising woven or knitted fabric which comprises strands of fabric material interlaced with strands of a ferrous material such as steel which attracts magnets.

According to another aspect, the invention comprises a method of covering a surface area with the composite article according to the invention. The surface area may be, for example, a wall, ceiling or floor of a building structure. The surface can be the surface of any object, including irregularly shaped objects and objects that are not planar. Objects to be displayed can be secured to the composite article by pushpin and/or magnetic securement. Further, the invention has the benefit of electromagnetically shielding a volume, such as the interior of a room, defined by a surface area covered by the composite article. For example, by applying the composite article to the walls/ceiling/floor of a room, it is possible to electromagnetically shield the volume defined by the room.

According to another aspect, the invention can provide sound absorption qualities, so that it can be used for acoustical insulation, for example, as an acoustical wall covering.

According to yet another aspect, the invention comprises a magnet attractive fluid that can be applied to a surface area to allow attachment of objects by magnetic securement.

Other features and advantages of the present invention as described above will become apparent from the following description of the invention which refers to the accompanying drawings.

BRIEF DESCRIPTION OF THE DRAWINGS

The invention will now be described in greater detail with reference to the drawings in which.

DETAILED DESCRIPTION OF EMBODIMENTS OF THE INVENTION

Figure 1:
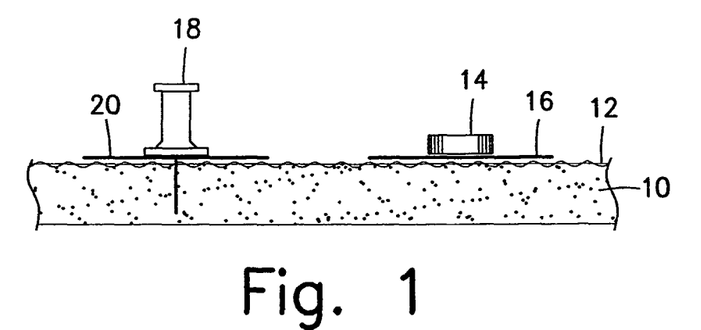
FIG. 1 shows a first embodiment of the display device according to the present invention.

With reference now to the drawings, FIG. 1 shows a first embodiment of the invention. As described, the invention relates to a display device, and in particular, a display material which is preferably both permeable to pushpins and which allows for magnetic securement. The invention thus allows for dual securement by magnet attractive material or pushpins.

According to a first embodiment, shown in FIG. 1, the invention comprises a material 10 which is permeable to pushpins. The material 10 comprises a substrate for a material 12 disposed on the surface of the material 10. The material 10 may have sound absorption qualities. The material 12 is a magnet attractive material or a magnetic material. For example, the material 12 may comprise iron or ferromagnetic material, magnet attractive material, or magnetic material. This allows securement by magnets or magnetic attractive material. For example, as shown in FIG. 1, if the material 12 is magnet attractive, a magnet 14 can be used to secure a memo or note 16 to the display device. Optionally, a pushpin, indicated at 18, may be secured to the permeable material 10 thereby securing an object such as a memo or note 20 or any other object to the display device.

Figure 2:
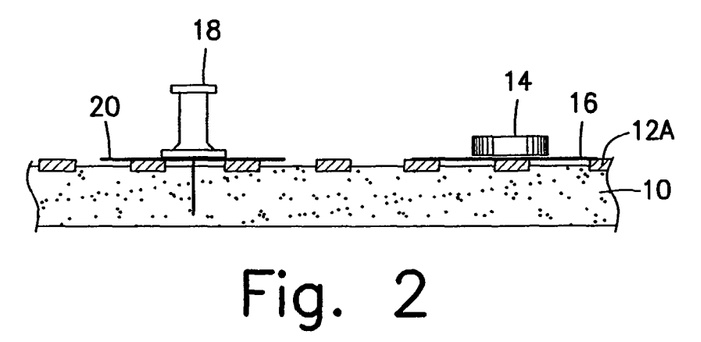
FIG. 2 shows a second embodiment of the display device according to the invention.
Figure 2A:
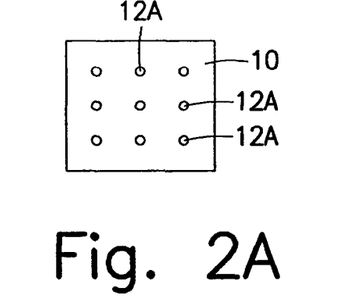
FIGS. 2A and 2B show in elevation/plan and sectional view, respectively, an embodiment wherein the magnetic or magnet attractive material is discontinuous.
Figure 2B:
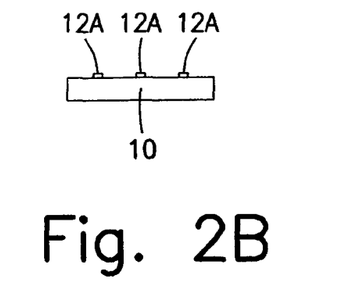

FIG. 2 shows another example of the display device in which the magnet attractive material or magnetic material may comprise an apertured or meshed, continuous or discontinuous, material 12A disposed on the surface of the substrate or permeable material 10.

Optionally, the material 12 or 12A may be magnetic itself in which case the object 14 may not be a magnet but a magnet attractive material such as ferrous material.

The display device according to FIGS. 1 and 2 comprises a composite material in which the magnet attractive or magnetic material 12 is embedded integrally with the substrate 10. The composite device may be precut for individual applications such as individual bulletin boards or may be flexible and rolled out in large sheets to be applied to large straight or curved surfaces. For example, the invention as shown in FIGS. 1 and 2 can be used as a wall covering such as wall paper, in which case the substrate 10 may be made sufficiently thin so that the push pins may be inserted directly through the material 10 to be received in the wall board on which the wall covering is attached.

The magnet attractive material or magnetic material 12 in the composite article may be either visible on the surface, visible by way of the surface texture of the composite or invisible in the composite. For example, the material 12 may be disposed on the surface but covered by an opaque material or embedded in the material 10. In all cases, this magnet attractive material or magnetic material would become an integral part of the object when the manufacturing of the composite article is completed.

Figure 3:
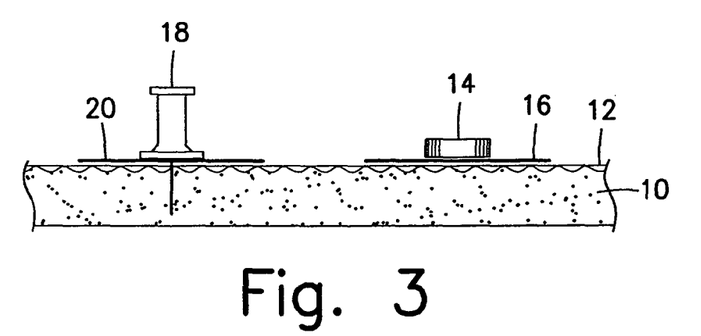
FIG. 3 shows a third embodiment of the display device according to the invention.
Figure 4:
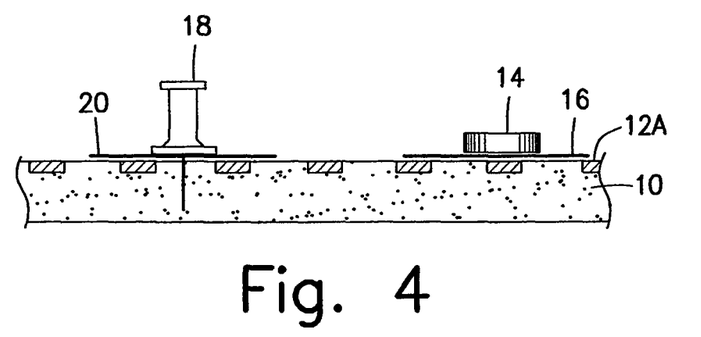
FIG. 4 shows a fourth embodiment of a display device according to the invention.

FIGS. 3 and 4 show further embodiments of the present invention. In FIGS. 3 and 4 the magnet attractive material or magnetic material is aligned with the surface of the substrate 10, i.e., it is not disposed on top of the surface but instead disposed so that the surface of the material 12 is in the same plane as the surface of the substrate 10. The material 12 is thus embedded in substrate 10 so that the outer surface of material 12 is in alignment with the outer surface of substrate 10.

Both embodiments shown in FIGS. 3 and 4 may be used in the same way as the embodiments described with respect to FIGS. 1 and 2.

Figure 5:
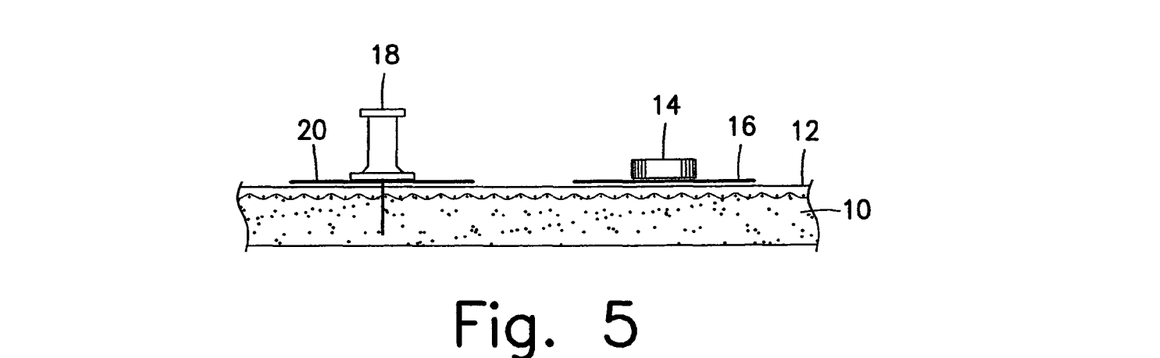
FIGS. 5, 6, and 7 shows further embodiments of the display device according to the invention.
Figure 6:
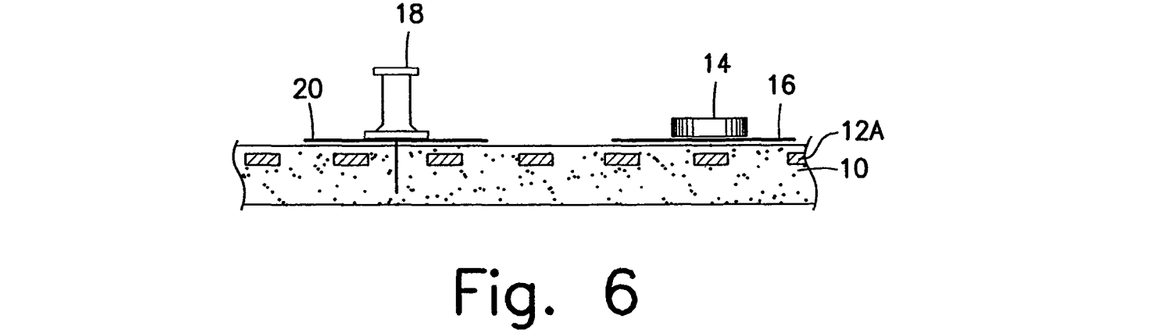
Figure 7:
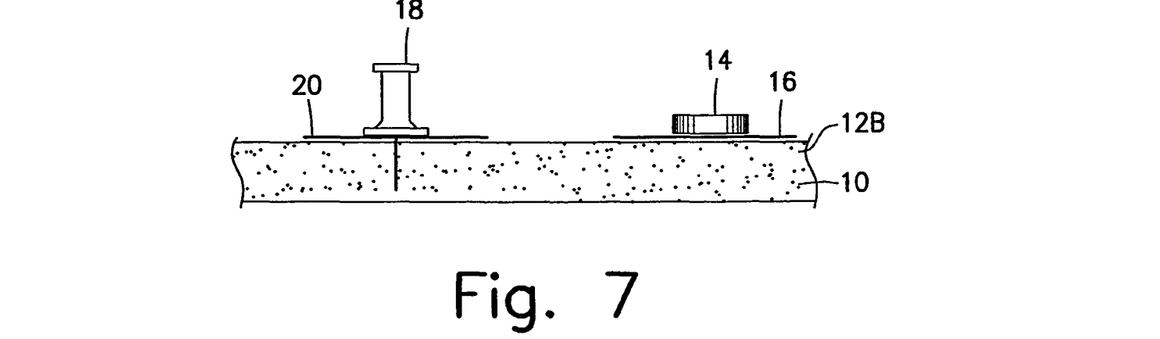
Figure 8:
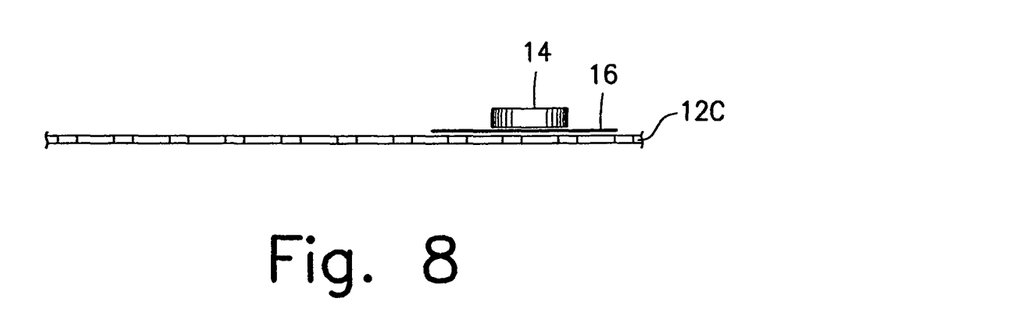
FIGS. 8, 9, 10 and 11 shows additional embodiments of the display device according to the invention.
Figure 9:
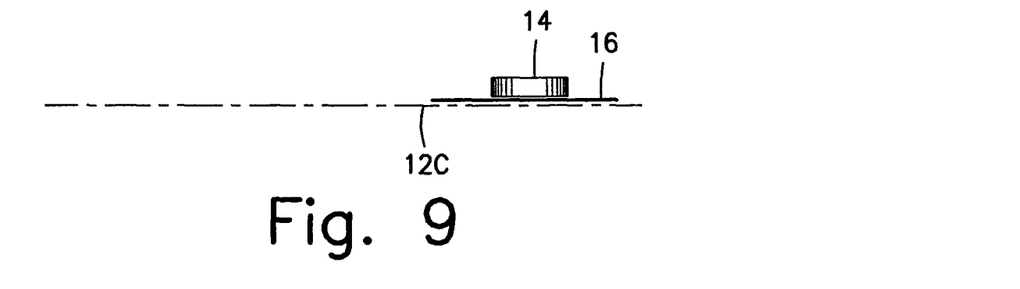

FIGS. 5, 6 and 7 show magnet attractive materials embedded more deeply in the material 10 which is permeable to pushpins. FIG. 7 shows an embodiment in which the magnet attractive material or magnetic material can comprise a powdered, sintered or particulate material embedded or dispensed in the substrate 10. The substrate may comprise a plastic resin gel or some other material to serve as a binder for the particulate and which is permeable to push pins, and preferably, self healing to allow the pin holes to be substantially imperceptible.

FIGS. 8, 9, 10 and 11 show further embodiments of the invention. These embodiments comprise a magnet attractive material or magnetic material 12C which can be deposited on a material which is optionally permeable to pushpins. The material 12C can also be sandwiched between two optionally pin permeable materials. The magnet attractive material or magnetic material 12C is also optionally permeable to the pushpins. The invention according to these embodiments can comprise a magnet attractive material or magnet material 12C which presents itself as a continuous or discontinuous material either in strands, separate individual pieces or as a laminated or woven layer, adhered or attached to another material to become an integral part of the structure of a non-woven or woven sheet material in which the magnet attractive or magnetic material either is visible or nonvisible and optionally permeable to pushpins for the display or memos, etc.

According to one of these embodiments, the invention comprises a magnet attractive material or magnetic material which can be strands, separate individual pieces or particles such as magnetic or ferromagnetic particulate or dust, a magnetic or magnet attractive fluid or paint laminated, deposited, adhered or otherwise attached to a substrate such as a woven or non-woven sheet material. The magnet attractive or magnetic material may be laminated between layers of woven or nonwoven sheet material or secured by an adhesive to a layer of such material. According to this embodiment, the technology described in U.S. Pat. No. 5,792,513 to Koslow et al. can be used to provide the composite article, in which case, a binder is provided for the particulate. However, a binder need not be used. According to the embodiments shown in FIGS. 8, 9, 10 and 11, the material is particularly flexible and can be utilized on vertical and horizontal walls surfaces, for example, as a wall covering or wallpaper. Accordingly, the wall covering can be used to attract magnets or magnet attractive material thereby for the display of objects by magnetic securement. Alternatively, because of its optional permeability to pushpins, pushpins can also be used to display objects. The magnet attractive or magnetic sheet creates a flexibility and a lightness in weight that enables the invention to conform to irregular surface forms thus presenting the possibility of being the top layer of the material which may optionally be permeable to pushpins with the pushpins secured through the display composite article to the material behind the sheet material, for example, wallboard, shown at 10A. According to the invention, the various layers may have an elastic quality.

Figure 10:
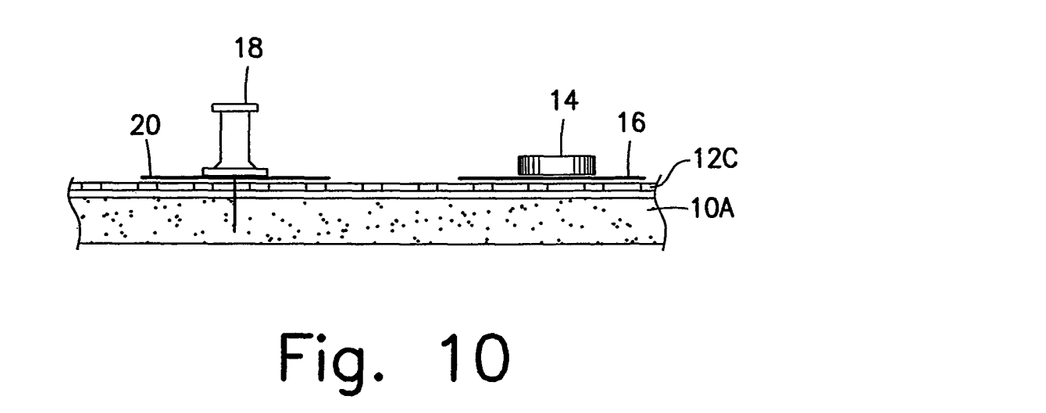
Figure 11:
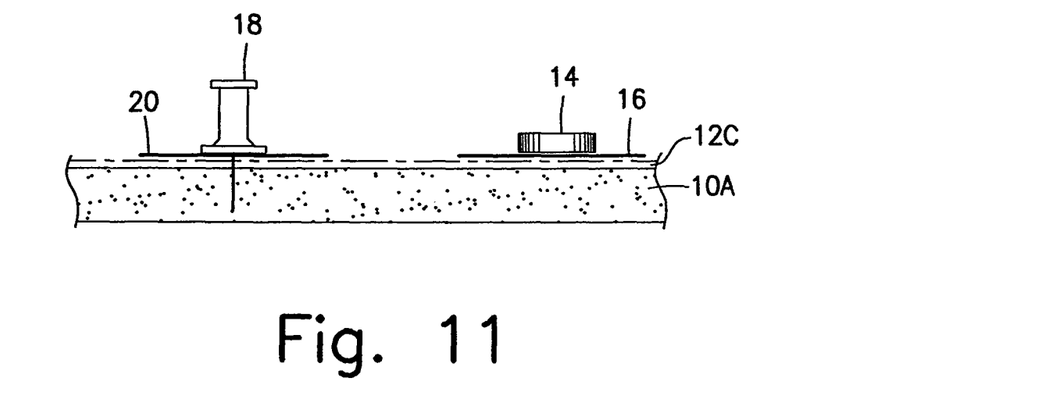

FIGS. 10 and 11 show the composite material adhered to a material 10A which is permeable to pushpins, such as wallboard of a wall of a housing or building structure.

According to another aspect, the invention may comprise a fluid having a magnet attractive material dispersed therein, such as ferromagnetic particles. The fluid can be applied to a surface such as a wall or any other object and may comprise, for example, a paint.

Figure 12:
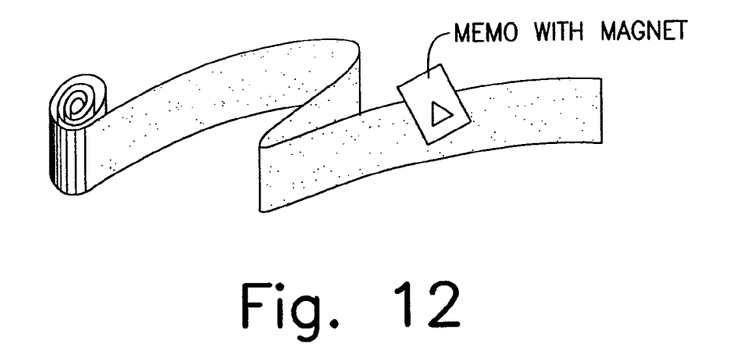
FIG. 12 shows an example of one of the embodiments of the invention.

FIG. 12 shows how the invention of the embodiments shown in FIGS. 8-11 is flexible to conform to different surfaces. A strip taken from a roll is shown in FIG. 12. The material can be made in large sheets or for example in roll such as wallpaper rolls, as shown. The magnet attractive or magnetic material can be visible on the surface or may be nonvisible. The magnet attractive or magnetic material can be embedded in the sheet material or may be laminated between sheet materials or deposited on the surface of a single piece of sheet material and be either exposed to view or be hidden by the sheet material. The sheet material may be provided with an adhesive already applied to one surface thereof so that the sheet material can be easily adhered to the surface of an object, for example, a wall.

Figure 13A:
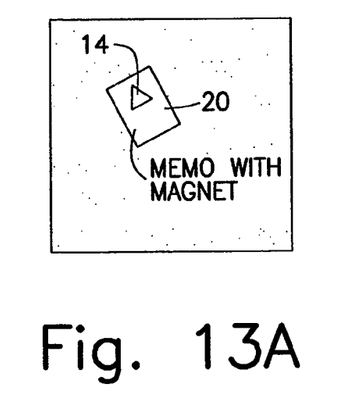
FIGS. 13A, B and C show use of the display device according to the invention.
Figure 13B:
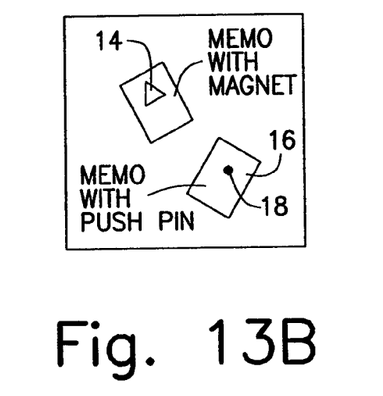
Figure 13C:
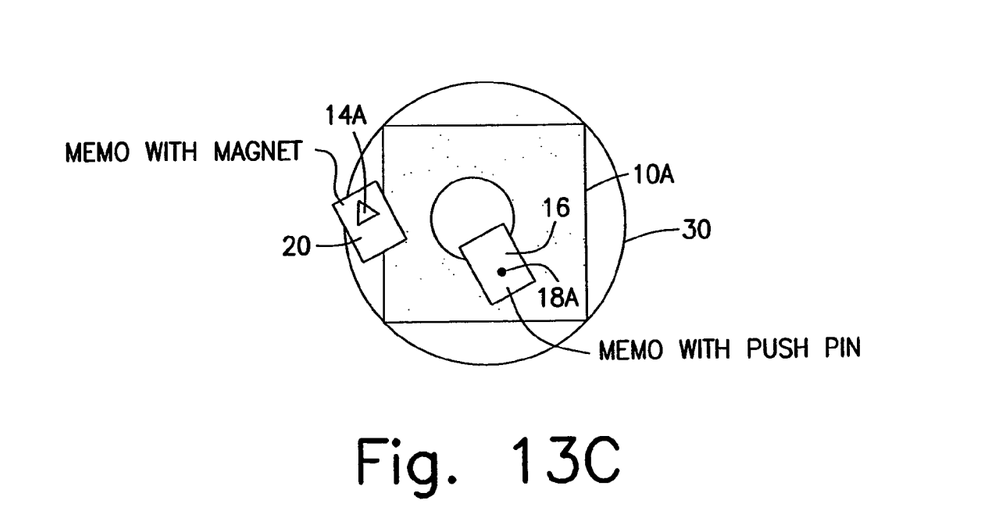

FIGS. 13A, B and C shows examples of the display device according to the present invention. In FIG. 13A, a memo is attached to the display device using a magnet 14. In FIG. 13B, a memo is secured by a magnet 14 and another memo is secured by a pushpin 18. In FIG. 13C, an example of the display device according to the present invention is shown in which the display device has a surface which is also permeable to pushpins. In FIG. 13C, reference numeral 10a is a pin permeable surface. Reference numeral 30 is, in the example, a donut shaped magnetic or magnet attractive layer of material which can be disposed over the surface 10A. Pushpin 18A is being used to secure a memo 16 to the display and a magnet 14A is being used to secure a memo 20 to the display device.

FIG. 14 shows a further aspect of the invention. This aspect of the invention relates to a way of using individual magnets by adding an adhesive substance to a surface 32 of a magnet 14 wherein a magnet with this adhesive surface can be adhered to objects that are not magnet attractive thereby allowing the objects which receives a magnet to be able to be secured to a magnetic attractive board, or other magnet attractive surface, e.g., a refrigerator surface. The magnet can be provided on a sheet of releasable backing material. The releasable backing material is shown at 34. A plurality of magnets can be disposed on the sheet 34 like "candy buttons". When a user needs to secure a non-magnetic or non ferrous object to a magnet attractive surface, the magnet is removed from the releasable backing, exposing the adhesive. The magnet is then adhered to the object with the adhesive and the object can then be attached to the magnet attractive surface via the adhered magnet.

Figure 14A:
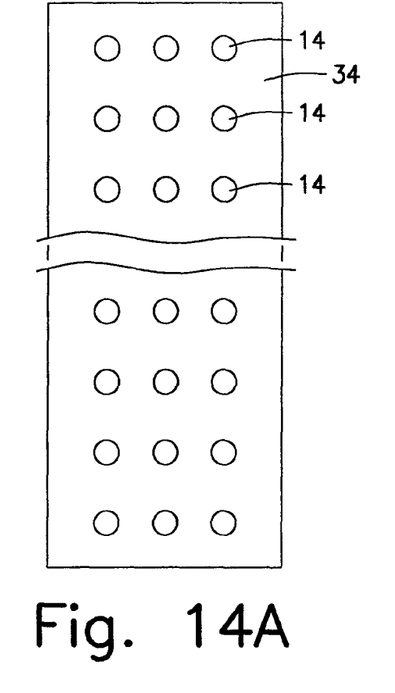
FIGS. 14A, B, C and D show examples of adhesive magnets according to the invention.
Figure 14B:
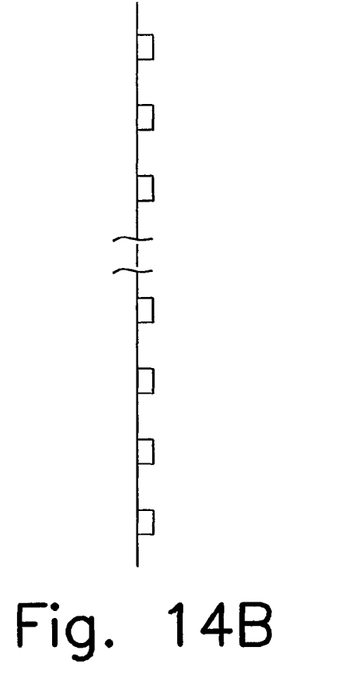
Figure 14C:
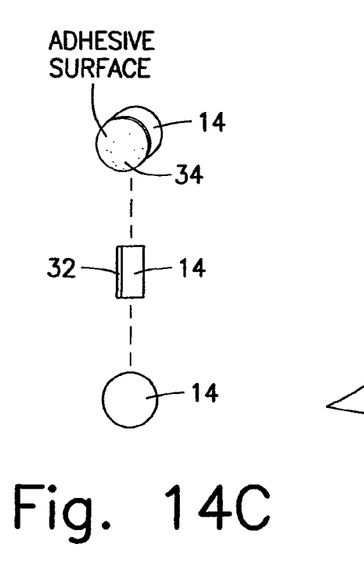
Figure 14D:
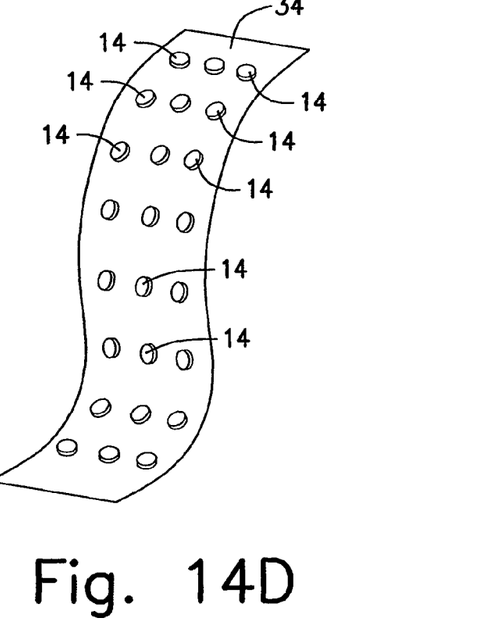

FIG. 14A shows a front view of magnets on a releasable backing according to the invention. FIG. 14B shows a side view of the magnets on the releasable backing. FIG. 14C shows a perspective, side view and front view of the magnet and FIG. 14D shows a perspective view of a sheet with the magnets attached thereon which can be removed from the releasable backing.

Figure 15A:
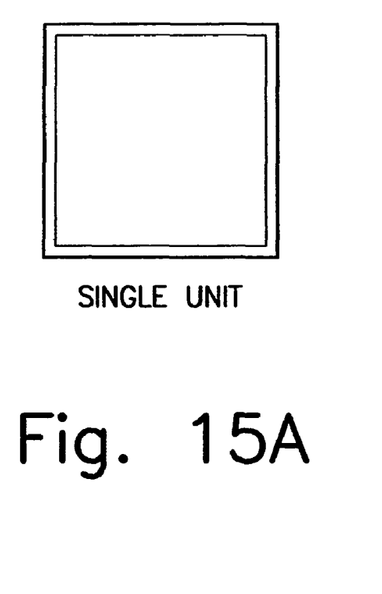
FIGS. 15A, B, C and D show the modularity feature of the present invention.
Figure 15B:
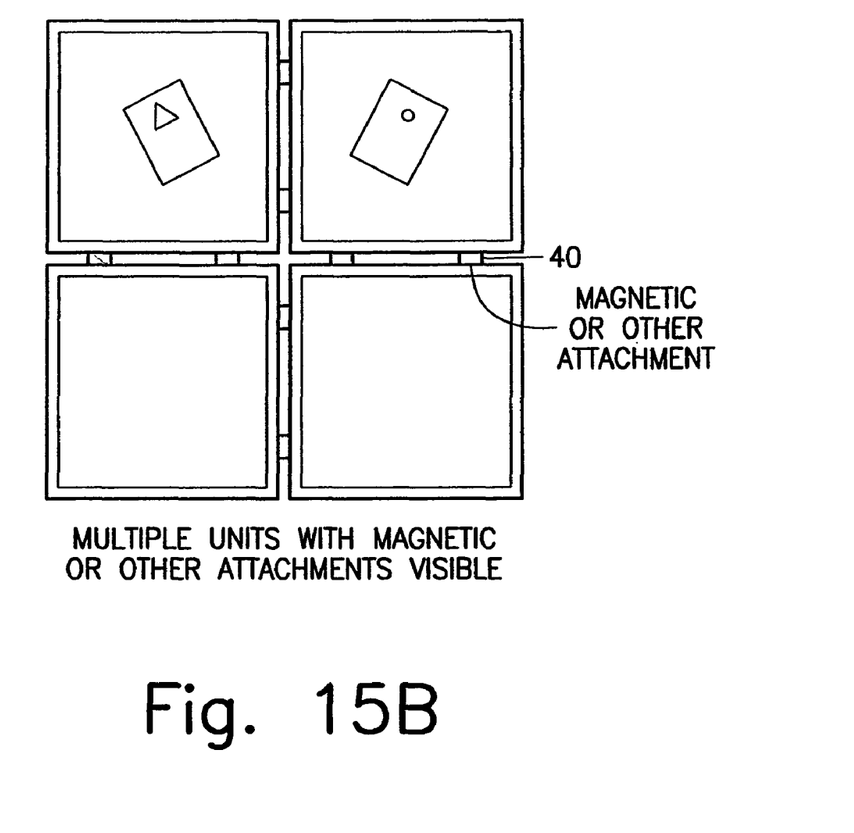
Figure 15C:
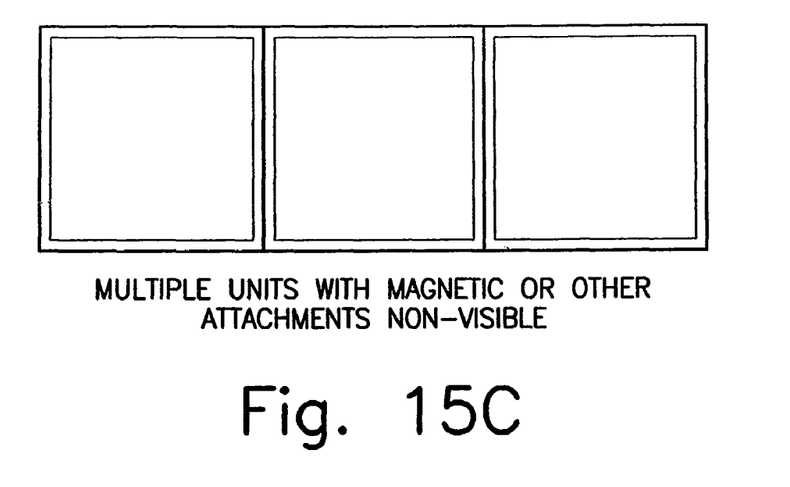
Figure 15D:
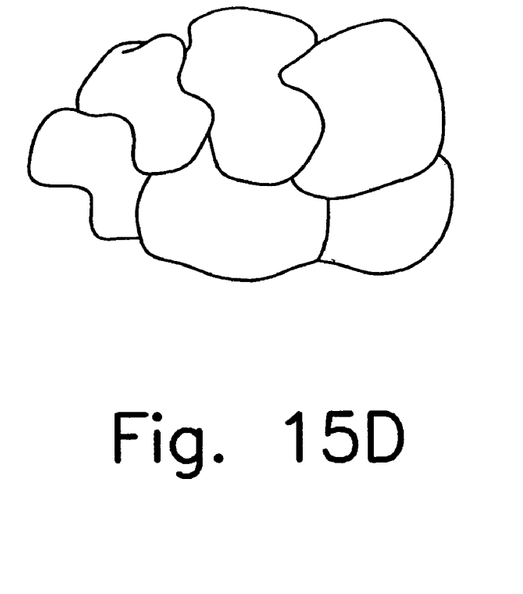

FIGS. 15A, B, C and D show how the invention can be modularized. The display device can comprise a bulletin board as shown in FIG. 15A wherein the individual display boards as shown in FIG. 15A are attached to one another to create a series of boards, a grid of boards or an irregular attachment of boards designed to prescribed dimensions to cover an area in a composite and continuous or discontinuous way. This individual display device can cover an area of wall surface for the purpose of increasing the overall coverage of the display devices in a systematic or non-systematic predetermined or spontaneous method. The individual display devices, as shown in FIG. 15A can be combined together by appropriate fastening means, as shown in FIGS. 15B and 15C. These fastening means may comprise screws or bolts or other fastening means such as clips. Alternatively, the fastening means may comprise magnets and/or magnet attractive materials as indicated at 40. The magnetic attachment may be visible as shown in FIG. 15B or nonvisible, as shown in FIG. 15C. If the individual boards are irregular in shape, they may be assembled together much like a jigsaw puzzle, as shown in FIG. 15D.

Figure 16A:
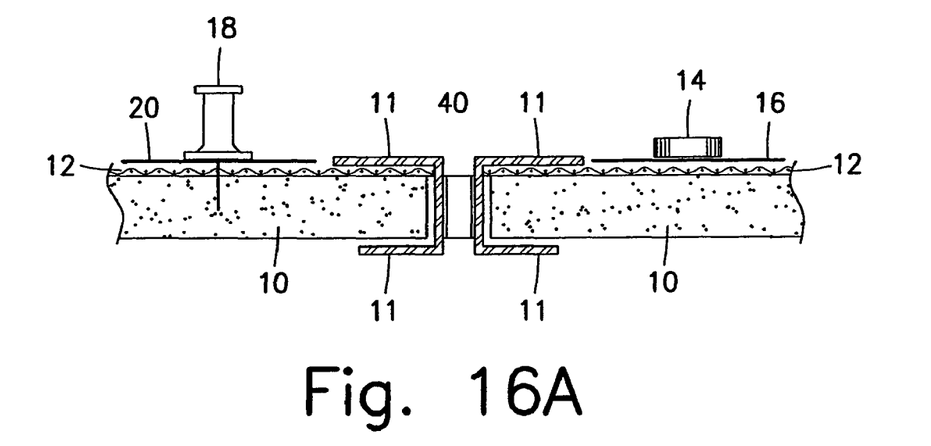
FIGS. 16A and B show further details of the modularity feature of the present invention.
Figure 16B:
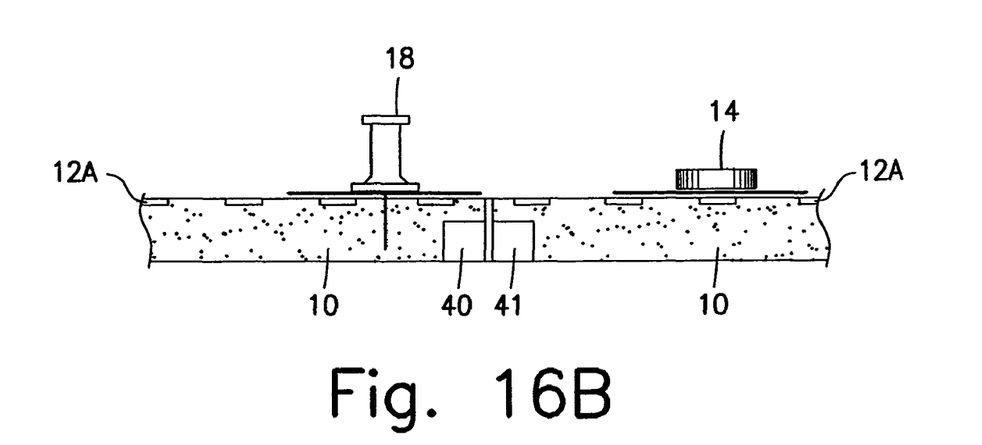

FIGS. 16A and 16B show details of the adjoining devices for the modular boards. One individual board can be joined to another by a magnet attractive material or a magnet. The magnet attractive or magnetic material can be an integral part of the board or framing system which when attached, can create a continuous grid of interconnecting boards thus providing variable surface coverage as desired. FIG. 16A shows an example wherein the attaching magnets 40 are visible. Each individual board may have a frame 11 which is made of a magnet attractive material thereby to be secured by the magnet 40.

Alternatively, as shown in FIG. 16B, the magnet/magnet attractive material may be disposed within the substrates 10 whereby to be hidden from view.

Figure 17A:
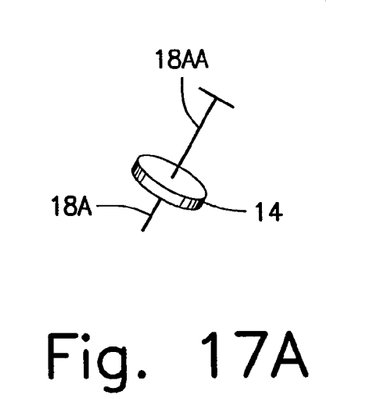
FIGS. 17A and B shows an embodiment of a magnet and pin according to the invention.
Figure 17B:
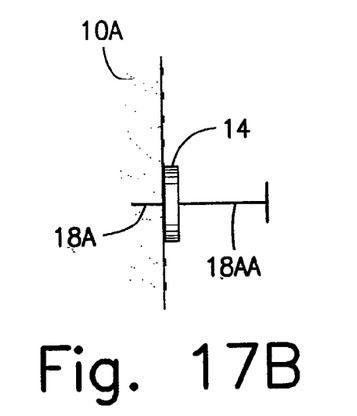

FIGS. 17A and 17B show a further aspect of the invention. The invention comprises an integral pin/magnet. The pin is shown schematically at 18A. Reference 18AA schematically represents a handle. The magnet is shown at 14. The properties of both the magnet attraction and the pushpin shaft attachment enhance the strength of securing articles to a board which has inherent properties of being able to accept both forms of attachment at the same time. This does not preclude using the magnetic/pin to display devices which are only able to accept pushpin attachments. In other words, they can be used both to secure items by pushpin alone or to secure items by the combination of pushpin and magnetic securement. FIG. 17B shows the combined magnet and pin securing an item to a substrate 10A such as a wall surface.

Figure 18A:
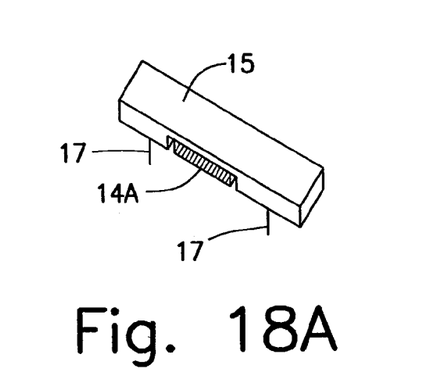
FIGS. 18A and B shows another embodiment of a magnet and pin housing surrounding the magnet.
Figure 18B:
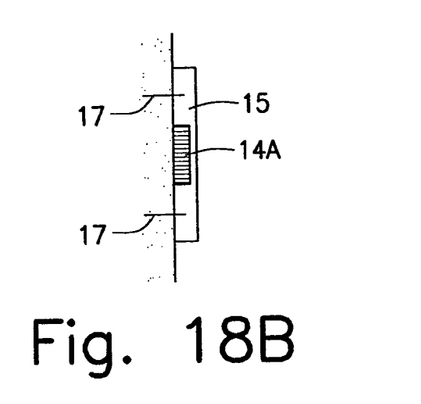

FIGS. 18A and 18B show a further embodiment of the invention wherein the magnet 14A is surrounded by a housing 15 that holds one or several pin shafts 17. This provides for increased securement of an object to the surface whereby the object is secured both by magnetic securement and by pushpin. The housing 15 may itself be pin permeable, thereby to allow pin securement to the housing 15.

Figure 19:
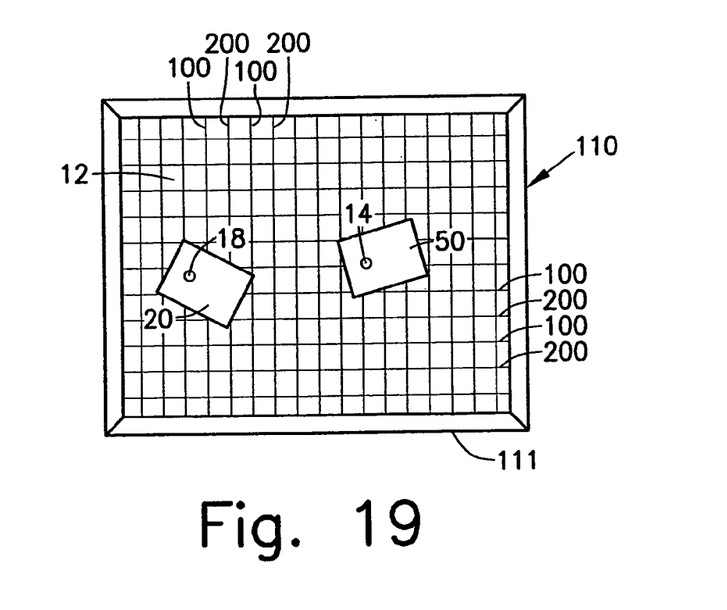
FIG. 19 shows another embodiment of the display device according to the present invention.

FIG. 19 shows a further embodiment according to the present invention.

Figure 19A:
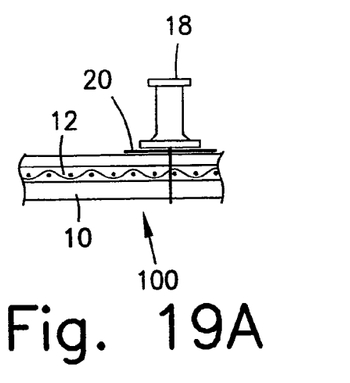
FIGS. 19A and 19B show cross-sections of the display device of FIG. 19.
Figure 19B:
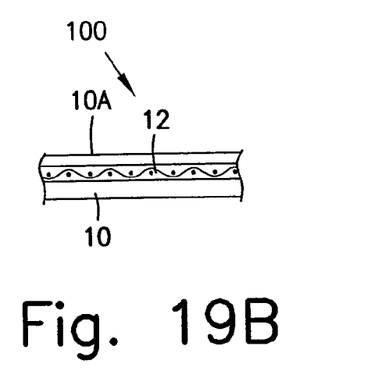

According to the invention of FIG. 19, a composite material made up of a woven or knitted fabric which comprises strands of fabric material interlaced with strands of a ferrous material such as steel, which attracts magnets, is provided. In this way, the material can be used as a display board, for example a bulletin board or it can be applied to wall surfaces or used for making wall surfaces, for example, as modular office walls or wall paper. Because of the ferrous material interwoven with the fabric, the material will attract a magnet and accordingly, can be used to hold memos and other objects between the magnet and the material. For example, as shown in FIG. 19, the material 12 comprises interwoven fabric strands 100 and ferrous metallic strands 200. FIG. 19 is schematic only. The weave of the material 12 can be as fine or coarse as desired. A memo or note 50 can be attached to the board, indicated generally at 110, by a magnet 14. A memo or note can also be held by a conventional pushpin 18 by placing a permeable material 10 such as cork or rubber, etc., behind the woven material 12. Memos or notes can be fastened to the board 110 via a pushpin 18. See FIG. 19A. The woven material 12 may have sufficient body so that a backing material 10 is not required. Also, the material 12 may be made as a composite with the backing material (permeable or otherwise). For example, the material 12 may be adhered to, molded into, embedded in or integral with a material 10 such as a tack permeable resin or gel material. The resin or gel material may be self healing to tack punctures. The material 12 can be on the surface of the backing material or may be embedded in the resin or gel material. If embedded, and it is desirable to observe the texture of the material 12, then the resin or gel may transparent or translucent. However, the resin or gel may be opaque. FIG. 19B shows a cross section of the material 12 embedded in a resin or gel 10. Optionally, a board or a frame 111 may be provided, for example, if the material is used for a bulletin board.

Figures 20, 21:
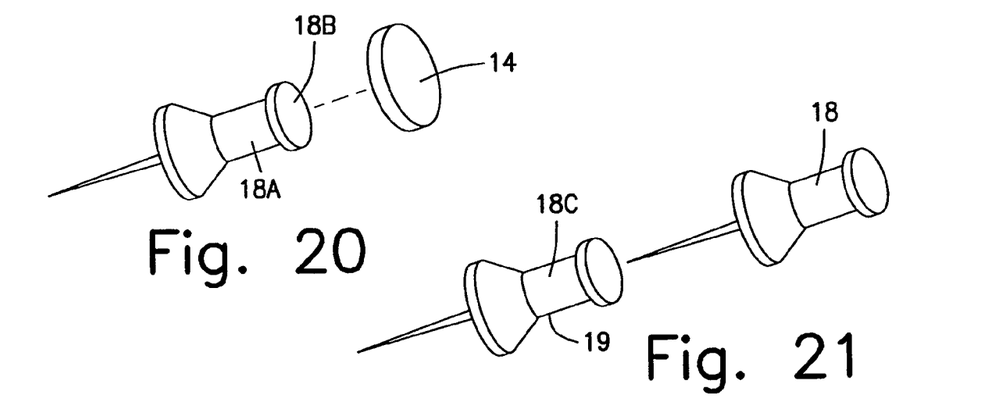
FIGS. 20, 21, 22 and 23 show embodiments of other magnetic and/or pushpin devices according to the present invention and/or combinations of other devices.

FIG. 20 shows further embodiments of pushpins which can be used with the composite article disclosed herein or any conventional bulletin board. FIG. 20 shows a pushpin 18A which has a ferromagnetic surface 18B, for example, made of steel or other ferromagnetic material. In this way, a magnet 14 can be attached to an already inserted pushpin 18A to hold a note or memo between pushpin 18A and the magnet 14.

FIG. 21 shows another pushpin which can be used with the article according to the invention or with a conventional bulletin board. Pushpin 18C is made of a permeable material 19 into which a further pushpin 18 can be inserted. In this way, a memo or note can be held between the pushpin 18C and the pushpin 18.

Figures 22, 23:
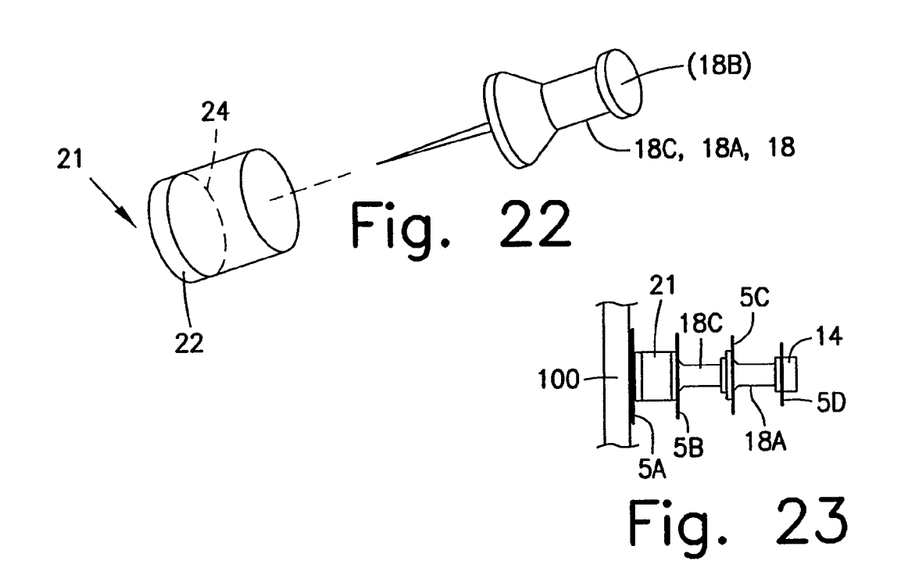

FIG. 22 shows a further embodiment of a magnet which can be used with the present invention. The magnet 21 is a composite magnet comprising a magnetic material 22 to which is attached an overlying permeable surface 24. A pushpin 18 can be inserted into the permeable surface 24 thereby allowing a memo or a note to be disposed between the composite magnet 21 and the pushpin 18.

A plurality of such magnets and pushpins can be stacked in any combination. For example, the composite magnet 21 can have a pushpin such as a pushpin 18c inserted therein to which another pushpin 18A or 18C can be attached. Depending on the type of pushpin used, i.e., pushpin 18A or the pushpin 18C, either a magnet or further pushpin can be attached thereto. For example, FIG. 23 which shows a composite magnet 21 attached to board 10 comprising material 12 to which magnet 21 a pushpin 18C is attached to which a further pushpin 18A is attached to which a magnet 14 is attached, each with a memo 5A, 5B, 5C and 5D disposed therebetween.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A method of using a pushpin and a magnet comprising:
providing a pin having a gripping handle with a magnet attractive top surface configured to receive the magnet by magnetic attraction;
inserting the pin into a pin permeable object for frictional engagement with the pin permeable objection; and
placing the magnet on the top surface of the pin with an object for display between the magnet and the top surface and which object will not prevent magnetic attraction of the magnet to the top surface, whereby the magnet retains the object on the top surface without further external support.

* * * * *